(12) United States Patent
Lee et al.

(10) Patent No.: US 7,365,822 B2
(45) Date of Patent: Apr. 29, 2008

(54) METHOD FOR FABRICATING LCD

(75) Inventors: Sang Seok Lee, Taegu-kwangyokshi (KR); Sang Ho Park, Pusan-kwangyokshi (KR); Moo Yeol Park, Taegu-kwangyokshi (KR); Sung Su Jung, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/184,115

(22) Filed: Jun. 28, 2002

(65) Prior Publication Data
US 2003/0156245 A1 Aug. 21, 2003

(30) Foreign Application Priority Data
Feb. 20, 2002 (KR) .................. 2002-9096
Feb. 26, 2002 (KR) .................. 2002-10170

(51) Int. Cl.
*G02F 1/13* (2006.01)
(52) U.S. Cl. .............. 349/187; 349/189; 349/190
(58) Field of Classification Search ............. 349/187, 349/189, 190, 153, 154
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,410,423 A * | 4/1995 | Furushima et al. | 349/190 |
| 5,499,128 A | 3/1996 | Hasegawa et al. | |
| 5,507,323 A | 4/1996 | Abe | |
| 5,511,591 A | 4/1996 | Abe | |
| 5,517,344 A * | 5/1996 | Hu et al. | 349/153 |
| 5,539,545 A | 7/1996 | Shimizu et al. | |
| 5,548,429 A | 8/1996 | Tsujita | |
| 5,642,214 A | 6/1997 | Ishii et al. | |
| 5,668,617 A * | 9/1997 | Na | 349/156 |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,898,041 A * | 4/1999 | Yamada et al. | 522/81 |

(Continued)

FOREIGN PATENT DOCUMENTS

EP 1003066 A1 5/2000

(Continued)

*Primary Examiner*—Steven S. Paik
(74) *Attorney, Agent, or Firm*—McKenna Long & Aldridge, LLP

(57) ABSTRACT

A method for fabricating an LCD includes the steps of (a) loading a first substrate and a second substrate having seals formed thereon on a bonding chamber, (b) bonding the first and second substrates, (c) fixing the bonded first and second substrates, and (d) unloading the fixed first and second substrates.

35 Claims, 14 Drawing Sheets

U.S. PATENT DOCUMENTS

| | | | |
|---|---|---|---|
| 5,943,113 A * | 8/1999 | Ichihashi | 349/187 |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A * | 12/2000 | Nakamura | 349/155 |
| 6,177,976 B1 * | 1/2001 | Murai et al. | 349/191 |
| 6,219,126 B1 | 4/2001 | von Gutfeld | |
| 6,222,603 B1 * | 4/2001 | Sakai et al. | 349/153 |
| 6,226,067 B1 | 5/2001 | Nishiguchi et al. | |
| 6,236,445 B1 | 5/2001 | Foschaar et al. | |
| 6,300,454 B1 * | 10/2001 | Hanelt et al. | 528/27 |
| 6,304,306 B1 | 10/2001 | Shiomi et al. | |
| 6,304,311 B1 * | 10/2001 | Egami et al. | 349/189 |
| 6,337,730 B1 | 1/2002 | Ozaki et al. | |
| 6,414,733 B1 | 7/2002 | Ishikawa et al. | |
| 6,552,772 B2 * | 4/2003 | Egami | 349/187 |
| 6,610,364 B1 * | 8/2003 | Kweon et al. | 427/256 |
| 6,628,365 B1 * | 9/2003 | Park et al. | 349/153 |
| 6,661,488 B1 * | 12/2003 | Takeda et al. | 349/117 |
| 2001/0021000 A1 | 9/2001 | Egami | |

FOREIGN PATENT DOCUMENTS

| | | |
|---|---|---|
| JP | 51-065656 | 6/1976 |
| JP | 57038414 | 3/1982 |
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62-054228 | 3/1987 |
| JP | 62-054229 | 3/1987 |
| JP | 62089025 | 4/1987 |
| JP | 62090622 | 4/1987 |
| JP | 62-054229 | 9/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 2073229 | 3/1990 |
| JP | 05-036426 | 2/1993 |
| JP | 05-107533 | 4/1993 |
| JP | 05127179 | 5/1993 |
| JP | 05-154923 | 6/1993 |
| JP | 05265011 | 10/1993 |
| JP | 05281557 | 10/1993 |
| JP | 05281562 | 10/1993 |
| JP | 06-018829 | 1/1994 |
| JP | 06051256 | 2/1994 |
| JP | 06-064229 | 3/1994 |
| JP | 06148657 | 5/1994 |
| JP | 6160871 | 6/1994 |
| JP | 06-194637 | 7/1994 |
| JP | 06-235925 | 8/1994 |
| JP | 06265915 | 9/1994 |
| JP | 06-313870 | 11/1994 |
| JP | 07-084268 | 3/1995 |
| JP | 07128674 | 5/1995 |
| JP | 07181507 | 7/1995 |
| JP | 07-275770 | 10/1995 |
| JP | 07-275771 | 10/1995 |
| JP | 08-076133 | 3/1996 |
| JP | 08-101395 | 4/1996 |
| JP | 08-110504 | 4/1996 |
| JP | 08095066 | 4/1996 |
| JP | 08106101 | 4/1996 |
| JP | 08-136937 | 5/1996 |
| JP | 08-173874 | 7/1996 |
| JP | 08171094 | 7/1996 |
| JP | 08190099 | 7/1996 |
| JP | 08240807 | 9/1996 |
| JP | 09-001026 | 1/1997 |
| JP | 09005762 | 1/1997 |
| JP | 09026578 | 1/1997 |
| JP | 09-061829 | 3/1997 |
| JP | 09073075 | 3/1997 |
| JP | 09073096 | 3/1997 |
| JP | 09-094500 | 4/1997 |
| JP | 09-127528 | 5/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-174924 | 6/1998 |
| JP | 10-177178 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11-014953 | 1/1999 |
| JP | 11014953 | 1/1999 |
| JP | 11038424 | 2/1999 |
| JP | 11064811 | 3/1999 |
| JP | 05-107533 | 4/1999 |
| JP | 11109388 | 4/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | 11-262712 | 9/1999 |
| JP | 11-264991 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000047226 | 2/2000 |
| JP | 2000-066165 | 3/2000 |
| JP | 2000-066218 | 3/2000 |
| JP | 2000-137235 | 5/2000 |
| JP | 2000-147528 | 5/2000 |
| JP | 3000-147528 | 5/2000 |
| JP | 2000-193988 | 7/2000 |
| JP | 2000-241824 | 9/2000 |
| JP | 2000-241825 | 9/2000 |
| JP | 2000-258782 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |

| | | | | | | |
|---|---|---|---|---|---|---|
| JP | 2001117105 | 4/2001 | | JP | 2002090760 | 3/2002 |
| JP | 2001-133745 | 5/2001 | | JP | 2002-122870 | 4/2002 |
| JP | 2001-133799 | 5/2001 | | JP | 2002107740 | 4/2002 |
| JP | 2001-147437 | 5/2001 | | JP | 2002122872 | 4/2002 |
| JP | 2001133794 | 5/2001 | | JP | 2002122873 | 4/2002 |
| JP | 2001142074 | 5/2001 | | JP | 2002-131762 | 5/2002 |
| JP | 2001147437 | 5/2001 | | JP | 2002-139734 | 5/2002 |
| JP | 2001-166272 | 6/2001 | | JP | 2002-156518 | 5/2002 |
| JP | 2001-166310 | 6/2001 | | JP | 2002-169166 | 6/2002 |
| JP | 2001-174829 | 6/2001 | | JP | 2002-169167 | 6/2002 |
| JP | 2001154211 | 6/2001 | | JP | 2002-182222 | 6/2002 |
| JP | 2001-183683 | 7/2001 | | JP | 2002080321 | 6/2002 |
| JP | 2001-209052 | 8/2001 | | JP | 2002202512 | 7/2002 |
| JP | 2001-209056 | 8/2001 | | JP | 2002202514 | 7/2002 |
| JP | 2001-209057 | 8/2001 | | JP | 2002214626 | 7/2002 |
| JP | 2001-209060 | 8/2001 | | JP | 2002-229042 | 8/2002 |
| JP | 2001-222017 | 8/2001 | | JP | 2002-236276 | 8/2002 |
| JP | 2001-235758 | 8/2001 | | JP | 2002-236292 | 8/2002 |
| JP | 2002-209058 | 8/2001 | | JP | 2002-258299 | 9/2002 |
| JP | 2001-215459 | 9/2001 | | JP | 2002-277865 | 9/2002 |
| JP | 2001-242471 | 9/2001 | | JP | 2002-277866 | 9/2002 |
| JP | 2001255542 | 9/2001 | | JP | 2002-277881 | 9/2002 |
| JP | 2001264782 | 9/2001 | | JP | 2002-287156 | 10/2002 |
| JP | 2001-201750 | 10/2001 | | JP | 2002-296605 | 10/2002 |
| JP | 2001-272640 | 10/2001 | | JP | 2002-311438 | 10/2002 |
| JP | 2001-281675 | 10/2001 | | JP | 2002-311440 | 10/2002 |
| JP | 2001-281676 | 10/2001 | | JP | 2002-311442 | 10/2002 |
| JP | 2001-281678 | 10/2001 | | JP | 2002-323687 | 11/2002 |
| JP | 2001-282126 | 10/2001 | | JP | 2002-323694 | 11/2002 |
| JP | 2001-305563 | 10/2001 | | JP | 2002-333628 | 11/2002 |
| JP | 2001-1281676 | 10/2001 | | JP | 2002-333635 | 11/2002 |
| JP | 2001-330837 | 11/2001 | | JP | 2002-333843 | 11/2002 |
| JP | 2001330840 | 11/2001 | | JP | 2002-341329 | 11/2002 |
| JP | 2001-337335 | 12/2001 | | JP | 2002-341355 | 11/2002 |
| JP | 2001-356353 | 12/2001 | | JP | 2002-341356 | 11/2002 |
| JP | 2001356354 | 12/2001 | | JP | 2002-341357 | 11/2002 |
| JP | 2002014360 | 1/2002 | | JP | 2002-341358 | 11/2002 |
| JP | 2002023176 | 1/2002 | | JP | 2002-341359 | 11/2002 |
| JP | 2001-042341 | 2/2002 | | JP | 2002-341362 | 11/2002 |
| JP | 2002049045 | 2/2002 | | KR | 2000-0035302 A1 | 6/2000 |
| JP | 2002-079160 | 3/2002 | | | | |
| JP | 2002082340 | 3/2002 | | | | |
| JP | 2002090759 | 3/2002 | | | | |

* cited by examiner

METHOD FOR FABRICATING LCD

This application claims the benefit of Korean Patent Application Nos. P2002-9096 filed on Feb. 20, 2002, and P2002-10170 filed on Feb. 26, 2002, which are hereby incorporated by reference for all purposes as if fully set forth herein.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display, and more particularly, to a method for fabricating an LCD having a liquid crystal dropping method applied thereto.

2. Discussion of the Related Art

In general, recent developments in the information communication field have increased demand for various types of display devices. In response to this demand, various flat panel displays such as liquid crystal display (LCD), plasma display panel (PDP), electro luminescent display (ELD), and vacuum fluorescent display (VFD) have been developed, some of which have been employed as displays in various products.

The LCDs have been used most widely as mobile displays while the LCD replaces the CRT (Cathode Ray Tube) because of features and advantages including excellent picture quality, light weight, thin profile, and low power consumption. In addition to the mobile type LCDs, such as a display for notebook computer, LCDs have been developed for computer monitors and televisions to receive and display broadcasting signals.

Despite various technical developments in the LCD technology with applications in different fields, research in enhancing the picture quality of the LCD as a display has been in some respects lacking as compared to the features and advantages of the LCD. Therefore, to use the LCD in various fields as a general display, the key to developing the LCD lies on whether the LCD can implement a high quality picture, such as high resolution, high luminance, and large sized screen while still maintaining light weight, thin profile, and low power consumption.

The LCD is provided with a liquid crystal panel for displaying a picture, and a driving part for providing a driving signal to the liquid crystal panel. The liquid crystal panel has first and second glass substrates bonded together with a gap between the substrates. A liquid crystal layer is formed by injecting liquid crystal between the first and second glass substrates.

On the first glass substrate (a TFT array substrate, for example), there are a plurality of gate lines arranged in a first direction at fixed intervals, a plurality of data lines arranged in a second direction perpendicular to the gate lines at fixed intervals, a plurality of pixel electrodes in respective pixel regions defined by the gate lines and the data lines in a matrix, and a plurality of thin film transistors switchable in response to a signal from the gate lines for transmission of a signal from the data line to the pixel electrodes.

The second glass substrate (a color filter substrate) has a black matrix layer for shielding light from areas excluding the pixel regions, red (R), green (G), blue (B) color filter layers, and a common electrode for implementing a picture.

The foregoing first and second substrates have a gap between them which is maintained by spacers, and bonded by a sealant. The seal has a liquid crystal injection inlet through which liquid crystal is injected after the two substrates are bonded and sealed.

After the individual liquid crystal panels are cut, the space between the two bonded substrates of each LCD panel is evacuated and the liquid crystal injection inlet is dipped in a liquid crystal bath, so that the liquid crystal is injected into the space by a capillary tube phenomenon. Once the liquid crystal is injected into the space between the two substrates the liquid crystal injection inlet is sealed by a sealant.

However, the related art method for fabricating an LCD having liquid crystal injected therein has the following problems. First, the related art method has poor productivity because the dipping of the liquid crystal in a liquid crystal bath while the space between the two substrates are maintained at a vacuum and the unit panels are cut into individual pieces for injection of the liquid crystal takes much time. Second, the liquid crystal injection, for a large LCD in particular, may cause imperfect filling of the liquid crystal in the panel, which may result in a defective panel. Third, the complicated and lengthy fabrication process requires the use of many liquid crystal injection devices, which occupies a large portion of space.

Accordingly, a method for fabricating an LCD by using a liquid crystal dropping method has been under research recently. Japanese Patent Application Nos. H11-089612, and H11-172903, and Japanese Laid-Open Patent Publication No. 2000-147528 disclose the following liquid crystal dropping method.

A related art method for fabricating an LCD having the foregoing liquid crystal dropping method applied thereto will be explained. FIGS. 1A–1F illustrate steps of a related art method for fabricating an LCD.

Referring to FIG. 1A, UV seal 1 is coated on a first glass substrate 3 having a thin film transistor array formed thereon to a thickness of approximately 30 μm, and liquid crystal 2 is dropped on an interior of the seal 1 which is the thin film transistor array part. No liquid crystal injection opening is provided in the seal 3.

The first glass substrate 3 is mounted on a table 4 in a vacuum container 'C' which is movable in a horizontal direction, and held by a plurality of first vacuum holes 5 on the entire bottom surface of the first glass substrate 3.

Referring to FIG. 1B, the bottom surface of the second glass substrate 6 having a color filter array formed thereon is held by vacuum using a second plurality of vacuum holes 7. The vacuum container 'C' is closed and evacuated. The second glass substrate 7 is moved downward in a vertical direction until a gap between the first glass substrate 3 and second glass substrate 6 is 1 mm. The table 4 supporting the first glass substrate 3 thereon is moved in a horizontal direction, to align the first and second glass substrates 3 and 6.

Referring to FIG. 1C, the second glass substrate 6 is moved downward until the second glass substrate 6 comes into contact with the liquid crystal 2 or the sealant 1. Referring to FIG. 1D, the table 4 with the first glass substrate 3 thereon is moved in a horizontal direction to align the first and second glass substrates 3 and 6. Referring to FIG. 1E, the second glass substrate 6 is moved further down until the gap between the second glass substrate 6 and the first glass substrate 3 becomes 5 μm.

Referring to FIG. 1F, the pre-bonded first and second glass substrates 3 and 6 are taken out of the vacuum container 'C', and a UV ray is directed to the sealant, to set the sealant 1, thereby completing the fabrication process.

However, the foregoing related art method for fabricating an LCD having the liquid crystal dropping method applied thereto has the following problems.

First, coating the sealant and dropping the liquid crystal on the same substrate requires much fabrication time before the two substrates can be bonded to each other.

Second, as the seal is coated and the liquid crystal is dropped on the first substrate while the second substrate sits idle, there is an unbalance of a fabrication process between the first and second substrates, resulting in an ineffective operation of the production line.

Third, because the seal is coated and the liquid crystal is dropped on the first substrate, the first substrate with a coat of the sealant applied thereto can not be subjected to cleaning by a USC. Therefore, as the sealant that will bond the two substrates should not be removed, undesirable particles also cannot be removed, which may cause defective contact of the sealant in the bonding.

Fourth, as size of the substrates increases, misalignment of the substrates may also increase during their an unloading process or another process after the substrates are bonded.

Fifth, misalignment of the substrates may cause defective orientations of the liquid crystal due to liquid crystal flow between substrates.

Sixth, misalignment of the substrates may induce poor apertures.

Seventh, defective orientations within the liquid crystal may cause blots related to scratches and luminance variations.

SUMMARY OF THE INVENTION

Accordingly, the present invention is directed to a method for fabricating a liquid crystal display that substantially obviates one or more of the problems due to limitations and disadvantages of the related art.

An advantage of the present invention is to provide a method for fabricating an LCD produced by a liquid crystal dropping method that may shorten fabrication time and maximize efficiency by improving productivity and reducing misalignment of the substrates within the LCD.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention, as embodied and broadly described, a method for fabricating a liquid crystal display includes the steps of: (a) loading a first substrate and a second substrate having seals formed thereon on a bonding chamber; (b) bonding the first and second substrates; (c) fixing the bonded first and second substrates together; and (d) unloading the fixed first and second substrates.

The seals may include a plurality of main seals for sealing liquid crystal that is dropped on each panel, a dummy seal for protecting the plurality of main seals, and fixing seals for fixing the first and the second substrates.

The step of fixing the bonded first and second substrates may include a step of at least directing light, applying heat, or applying pressure, or a combination thereof, to any of the main, fixing, and dummy seals. In the present aspect, the aforementioned seals may be partially fixed.

Accordingly, fixing step may employ light in a power range of about 50–500 mW may be directed for more than about 5 seconds and/or heat at a temperature range of about 50–200° C. may be applied for more than about 10 seconds. The light may be directed, or the heat be applied, by moving a light directing pin, or a heating device, from an upper side of the bonding chamber to a lower side of the bonding chamber or vice versa to thereby fix the seals to the substrates.

The fixing seals may be formed in a periphery of one of the substrates and/or may be formed in regions between panels that are to be cut apart. The main seals may be formed on the second substrate while the dummy seal may be formed on the first substrate. The dummy seal may be formed so as to encompass the plurality of main seals.

The step of fixing the bonded first and second substrates may further include the steps of coating an adhesive having a setting property better than that of the seals, to the second substrate in regions to be cut or in the periphery, and fixing the bonded substrates using the adhesive.

In another aspect of the present invention, a method for fabricating an LCD includes the steps of: (a) loading both a first substrate having main seals formed, and liquid crystal material dropped, thereon and to a second substrate having fixing seals formed thereon into a bonding chamber; (b) bonding the first and second substrates; (c) setting the fixing seals to fix the first and second substrates together; and (d) unloading the fixed first and second substrates.

In further aspect of the present invention, a method for fabricating an LCD includes the steps of: (a) loading both a first substrate having main and fixing seals formed, and liquid crystal material dropped, thereon and a second substrate into a bonding chamber; (b) bonding the first and second substrates; (c) setting the fixing seals to fix the first and second substrates together; and (d) unloading the fixed first and second substrates.

In still further aspect of the present invention, a method for fabricating an LCD includes the steps of: (a) loading both a first substrate having fixing seals formed, and liquid crystal material dropped, thereon and a second substrate having main seals formed thereon into a bonding chamber; (b) bonding the first and second substrates; (c) setting the fixing seals to fix the first and second substrates together; and (d) unloading the fixed first and second substrates.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

FIGS. 2A–2F schematically illustrate steps of a method for fabricating an LCD in accordance with an embodiment of the present invention.

Figure 1A:
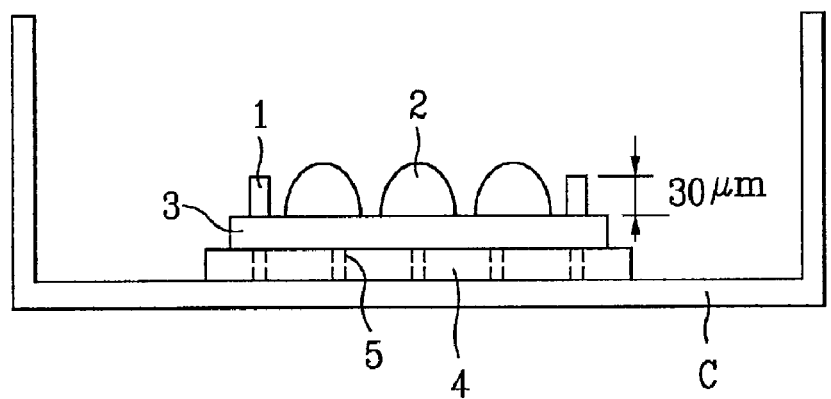
FIGS. 1A–1F illustrate sections showing the steps of a related art method for fabricating an LCD having a liquid crystal dropping method applied thereto, schematically.
Figure 1B:
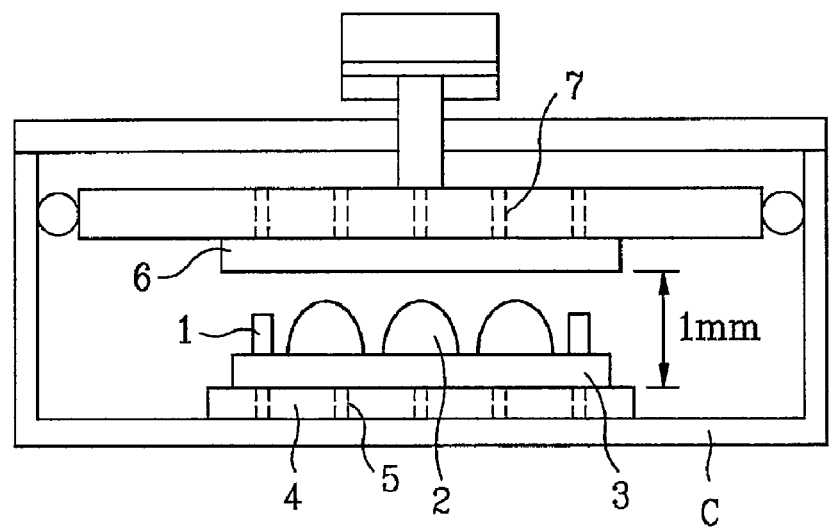
Figure 1C:
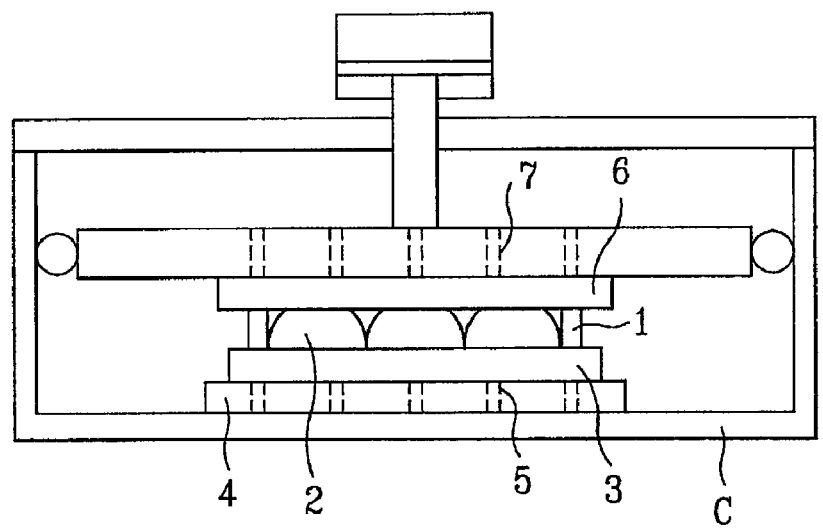
Figure 1D:
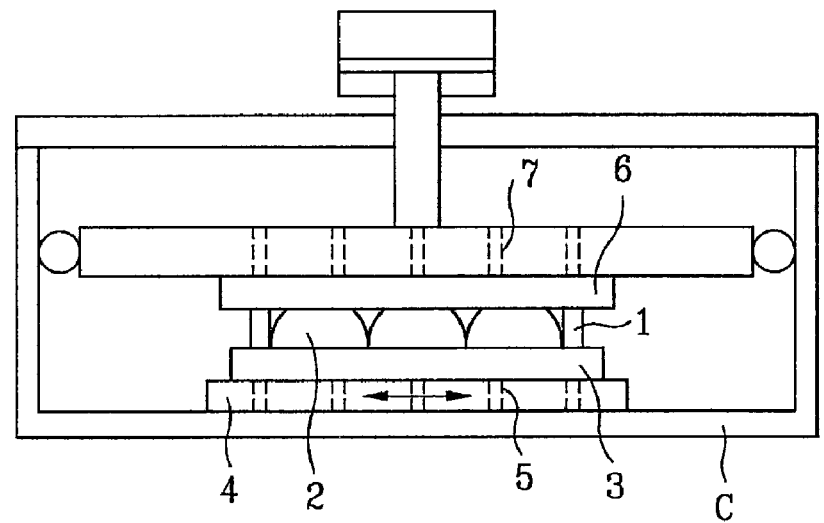
Figure 1E:
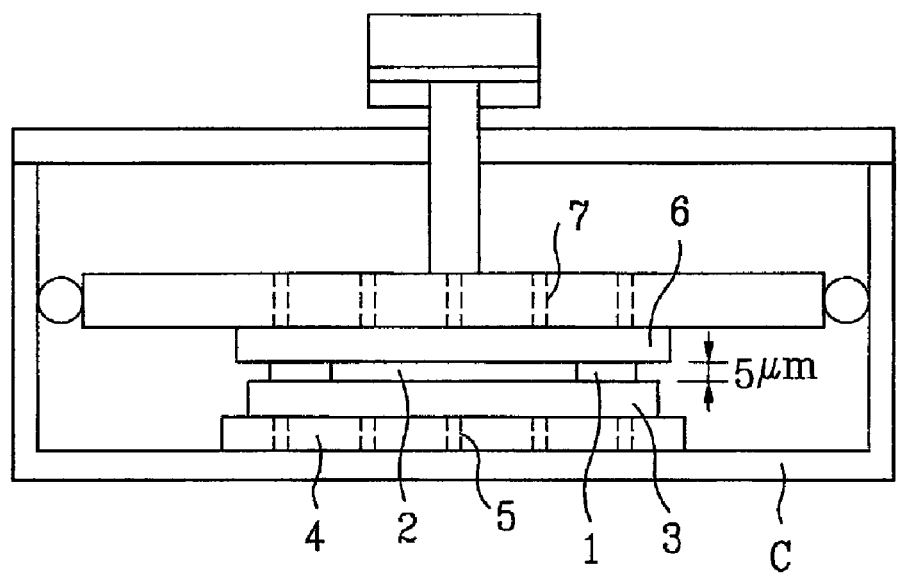
Figure 1F:
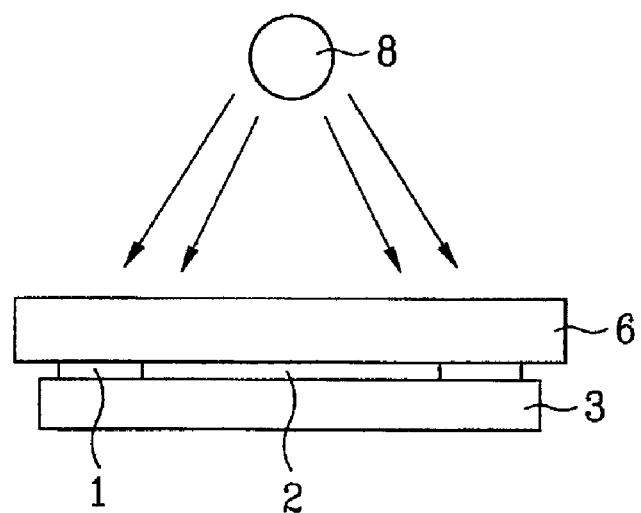
Figure 2A:
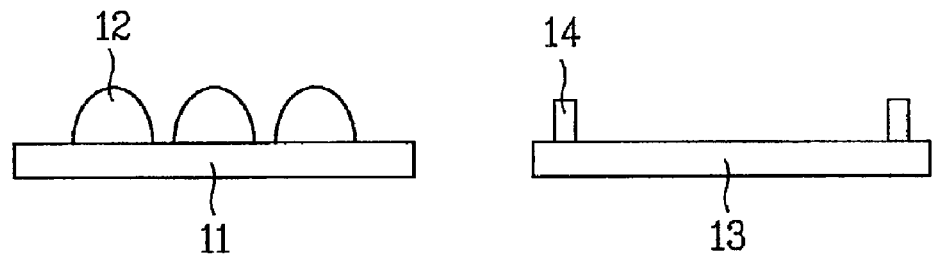
FIGS. 2A–2F schematically illustrate steps of a method for fabricating an LCD having a liquid crystal dropping method applied thereto in accordance with an embodiment of the present invention.

Referring to FIG. 2A, liquid crystal 12 may be applied to a first glass substrate 11, and a seal 14 may be formed on a second glass substrate 13. A plurality of corresponding areas designated for panels may be provided in first and second glass substrates 11 and 13, and thin film transistor arrays may be formed on each of the panels within the first glass substrate 11 while color filter arrays, black matrix layers, a color filter layers, common electrodes, etc., may be formed on each of the panels of the second glass substrate 13. Liquid crystal material 12 may be applied onto the first glass substrate 11 and a seal 14 may be coated onto the second glass substrate 13. Alternatively, the seal 14 may be coated on the first glass substrate 11 and the liquid crystal material 12 may be dropped on the second glass substrate 13 or both the liquid crystal material 12 and the seal 14 may be dropped and coated on either of the two glass substrates. In any case, however, when placed into the vacuum bonding chamber to be bonded with another substrate, the glass substrate having the liquid crystal dropped thereon must be placed on a lower stage, as will be discussed in greater detail below.

Figure 3:
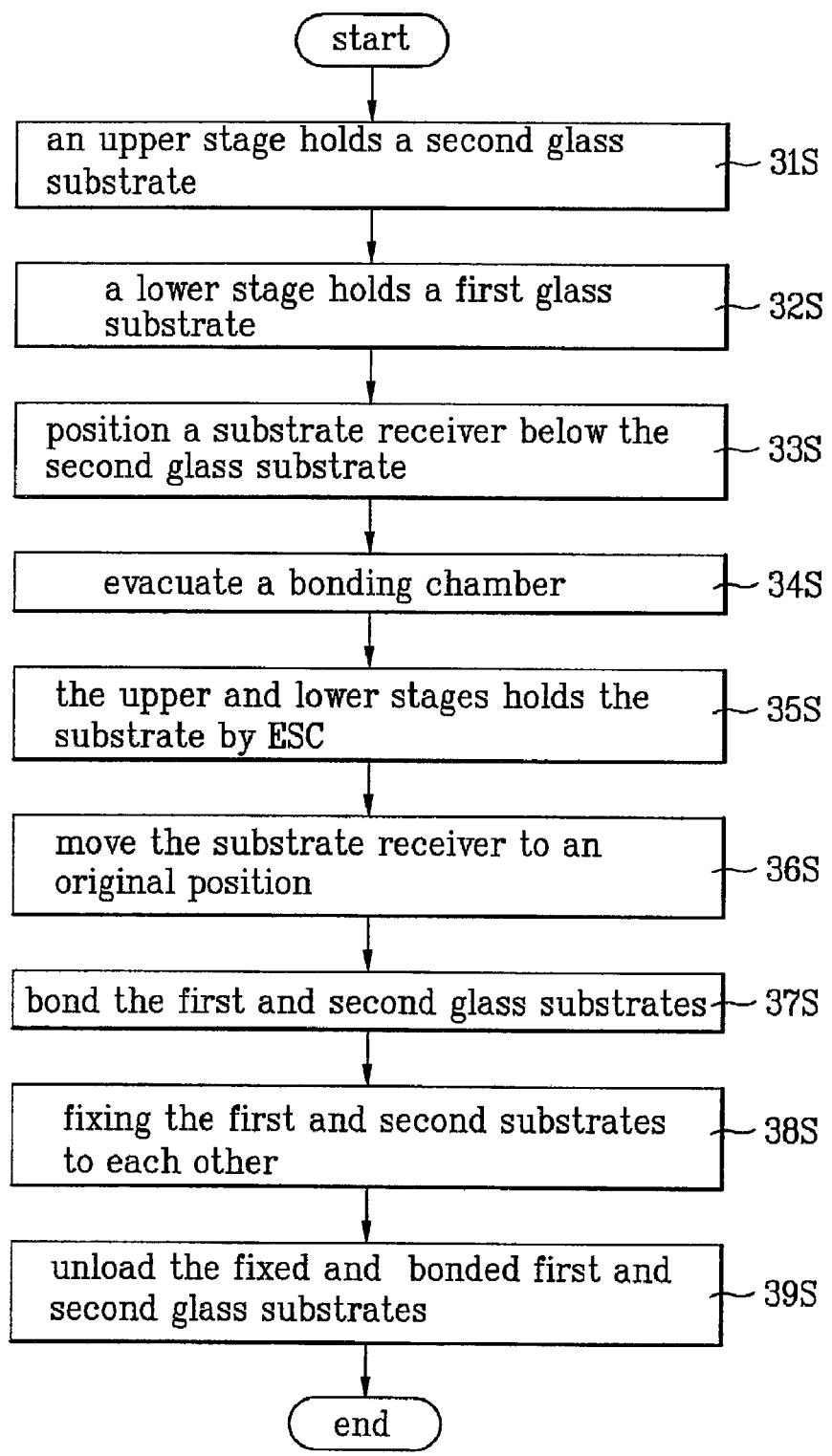
FIG. 3 illustrates the bonding steps in accordance with an embodiment of the present invention.

Referring now to FIG. 3, a bonding process in accordance with an embodiment of the present invention may be explained.

Generally, the bonding process includes steps of loading the two substrates into a vacuum bonding chamber, bonding the two substrates, setting the seal of the bonded substrates to fix the bonded substrates together, and unloading the bonded two substrates from the vacuum bonding chamber.

Before loading the first and second substrates 11 and 13 into the vacuum bonding chamber, a seal is formed on the second glass substrate 13. Subsequently, particles formed during various fabrication processes are removed from the second glass substrate in a USC (Ultra Sonic Cleaner). Since no liquid crystal applied onto the second glass substrate 13, coated by the seal, the second glass substrate 13 can be cleaned.

Figure 2B:
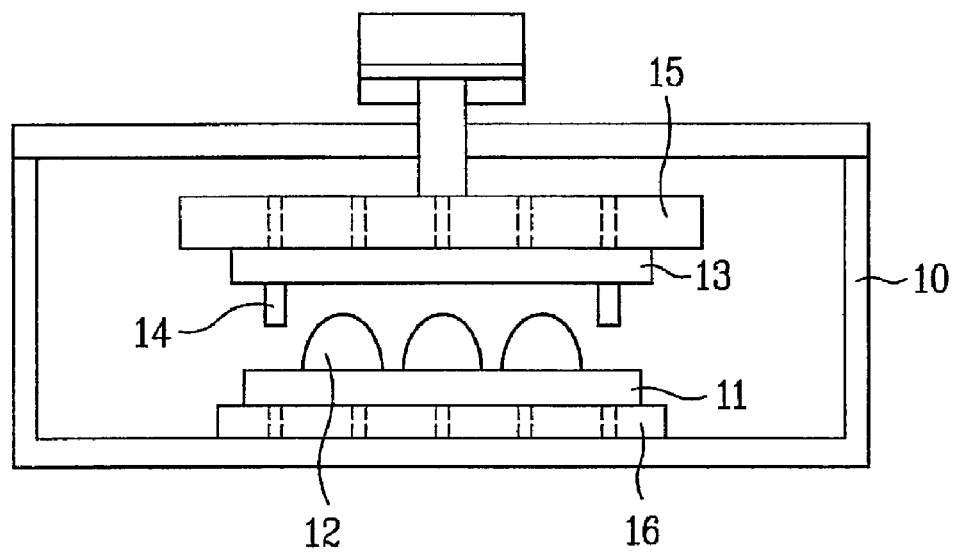

Referring generally to FIG. 2B, the second glass substrate 13 is held to an upper stage 15 in the vacuum bonding chamber 10, wherein the seal 14 faces down (31S), and the first glass substrate 11 is held to a lower stage 16 in the vacuum bonding chamber 10 (32S), wherein the liquid crystal material 12 faces up. The vacuum bonding chamber 10 is hereby in a standby state.

More specifically, the second glass substrate 13 with the seal 14 facing down is held by a loader of a robot (not shown), and is brought into the vacuum bonding chamber 10. The upper stage 15 in the vacuum bonding chamber 10 is moved down to meet and hold the second glass substrate 13, and is then moved back up. The second glass substrate 13 may be held to the upper stage 15 with the use of a vacuum force or with an electrostatic force.

Then, the loader is moved out of the vacuum bonding chamber 10 and places the first glass substrate 11 over the lower stage 16 in the vacuum bonding chamber 10.

Next, the second glass substrate 13 is placed on a substrate receiver (not shown) by placing the substrate receiver under the second glass substrate 13 and moving the upper stage down, or the substrate receiver up, or both, until the second glass substrate 13 contacts the substrate receiver (33S). After the second glass substrate 13 and the substrate receiver are brought into contact, the second glass substrate 13 is held to the upper stage.

The substrate receiver contacts an under side of the second glass substrate 13, to prevent the second glass substrate held to the upper stage from becoming detached from the upper stage due to a reduction in a vacuum force present within the upper stage when a vacuum in the bonding chamber becomes higher than the vacuum force within the upper and lower stages.

Accordingly, the second glass substrate 13, held to the upper stage, may be placed on the substrate receiver before or during the creation of a vacuum in the vacuum bonding chamber. Alternatively, the upper stage holding the second glass substrate and the substrate receiver may be brought to within a predetermined distance of each other so that the second glass substrate 13 may be safely placed on the substrate receiver from the upper stage when the chamber is evacuated. Moreover, means for securing the substrates may be provided additionally as air flow in the chamber, capable of shaking the substrates, may occur when evacuation of the vacuum bonding chamber is initiated (34S).

The vacuum within the vacuum bonding chamber 10 may have a pressure in a range of about $1.0 \times 10^{-3}$ Pa to about 1Pa for IPS mode LCDs, and about $1.1 \times 10^{-3}$ Pa to about $10^2$ Pa for TN mode LCDs.

Evacuation of the vacuum bonding chamber 10 may be carried out in two stages. After the substrates are held to their respective stages, a chamber door is closed and the vacuum chamber is evacuated a first time. After positioning the substrate receiver under the upper stage and placing the substrate on the substrate receiver or after positioning the upper stage and the substrate receiver to within the predetermined distance when the upper stage biases the substrate, the vacuum bonding chamber is evacuated for a second time. The second evacuation is faster than the first evacuation. The vacuum force created by the first evacuation is not higher than the vacuum force within the upper stage.

The aforementioned two stage evacuation process may prevent deformation or shaking of the substrates in the vacuum bonding chamber that conventionally occurs when the vacuum boning chamber is rapidly evacuated.

Alternatively, evacuation of the bonding chamber may be carried out in a single stage. Accordingly, after the substrates are held to their respective stages and the chamber door is closed, the evacuation may be started and the substrate receiver may be brought to the underside of the upper stage during the evacuation. The substrate receiver must be brought to the underside of the upper stage before the vacuum force within the vacuum bonding chamber becomes higher than the vacuum force within the upper stage.

Once the vacuum bonding chamber 10 is evacuated to a preset vacuum, the upper and lower stages 15 and 16 bias and fix the first and second glass substrates 11 and 13 respectively using an ESC (Electro Static Charge) (35S) and the substrate receiver is brought to its original position (36S) out from under the upper plate.

Using ESC the first and second glass substrates may be held to their respective stages by applying negative/positive DC voltages to two or more plate electrodes (not shown) formed within the stages. When the negative/positive voltages are applied to the plate electrodes, a coulombic force is generated between a conductive layer (e.g., transparent electrodes, common electrodes, pixel electrodes, etc.) formed on the substrate and the stage. When conductive layer formed on the substrate faces the stage, about 0.1–1 KV is applied to the plate electrodes. When the substrate contains no conductive layer, about 3–4 KV is applied to the plate electrodes. An elastic sheet may be optionally be provided to the upper stage.

Figure 2C:
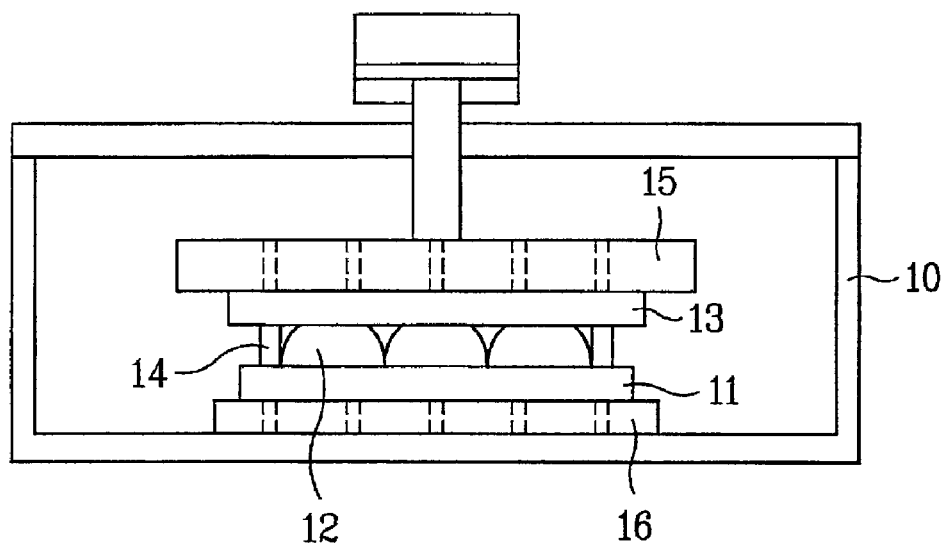
Figure 2D:
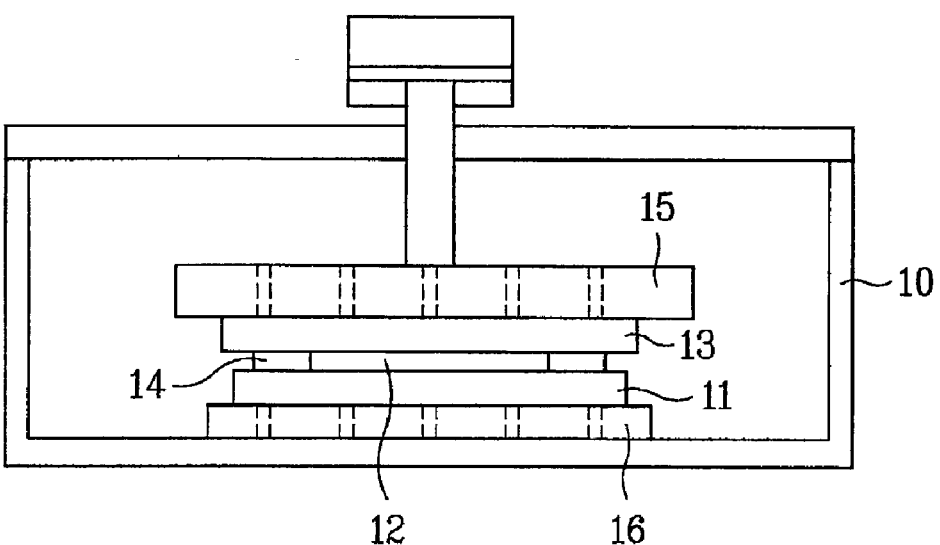

Referring to FIGS. 2C and 2D, after the two glass substrates 11 and 13 are aligned and held to their respective stages by ESC, the two stages are moved into proximity such that the two glass substrates may be bonded together (37S). The first and second glass substrates 11 and 13 are pressed together by moving either the upper stage 15 or the lower stage 16 in a vertical direction, while varying speeds and pressures at different stage locations. Until the time the liquid crystal 12 on the first glass substrate 11 and the second glass substrate 13 come into contact, or until the time the first glass substrate 11 and the seal on the second glass substrate 13 come into contact, the stages are moved at a fix speed or fixed pressure, and the pressure is boosted up step by step from the time of contact to a final pressure. That is, the time of contact may be sensed by a load cell fitted to a shaft of the movable stage. The two glass substrates 11 and 13 may, for example, be pressed at a pressure of 0.1 ton at the time of contact, a pressure of 0.3 ton at an intermediate time period, a pressure of 0.4 ton at a full contact stage, and a pressure of 0.5 ton at a final stage (see FIG. 2D).

Though it is illustrated that the upper stage presses down onto the substrate by means of one shaft, a plurality of shafts may independently apply and control pressure using an individual load cell. If the lower stage and the upper stage are not leveled or fail to be pressed uniformly, predetermined shafts may be selectively pressed using lower or higher pressures to provide uniform bonding of the seal.

Figure 2E:
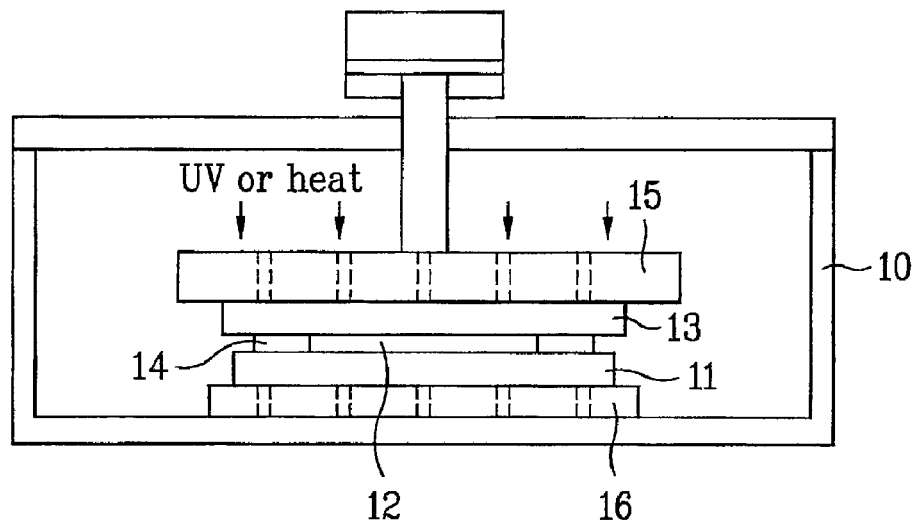

Referring to FIG. 2E, after the two substrates are bonded, a UV ray may be directed, and/or heat may be applied, to the seal in order to cure or harden and fix the first and second glass substrates 11 and 13 together (38S). Because the substrates are large (e.g., 1.0 m×1.2 m), and the two substrates are bonded after the liquid crystal is applied, misalignment of the two substrates may occur during subsequent processes or during transfer after the bonding step. Therefore, the fixing is made for prevention of the misalignment of the bonded two substrates and maintaining a bonded state during the next process or transfer after the bonding.

The method of fixing the two substrates to each other will be explained in more detail.

Fixing the two substrates occurs within the bonding chamber under a vacuum or atmospheric pressure. Though it is preferable that the fixing is carried out after the bonding, the fixing may be carried out before the bonding is finished. For simplification of the process, though it is preferable that material of the fixing seal is the same as that of the main seal, material of fixing seal may be different from the main seal to improve efficiency in the fixing process. The fixing seal may, for example, be a photosetting resin, a thermosetting resin, a UV-thermosetting resin, a pressure setting resin, or any other material with a high adhesive force. Fixing conditions used with the photosetting resin may, for example, a UV ray having a power of 50–500 mW (e.g., 200 mW) directed for about 5–40 seconds (e.g., about 14 seconds). Fixing conditions used with the thermosetting resin may be dependent on a material of the fixing seal and may, for example, include a setting temperature in a range of about 50–200° C. applied to the seal for more than about 10 seconds. Accordingly, the bonded substrate may be fixed by any one of light, heat, light and heat, and pressure. The fixing seal may or may not be coated on the same substrate as the main seal.

Figure 4:
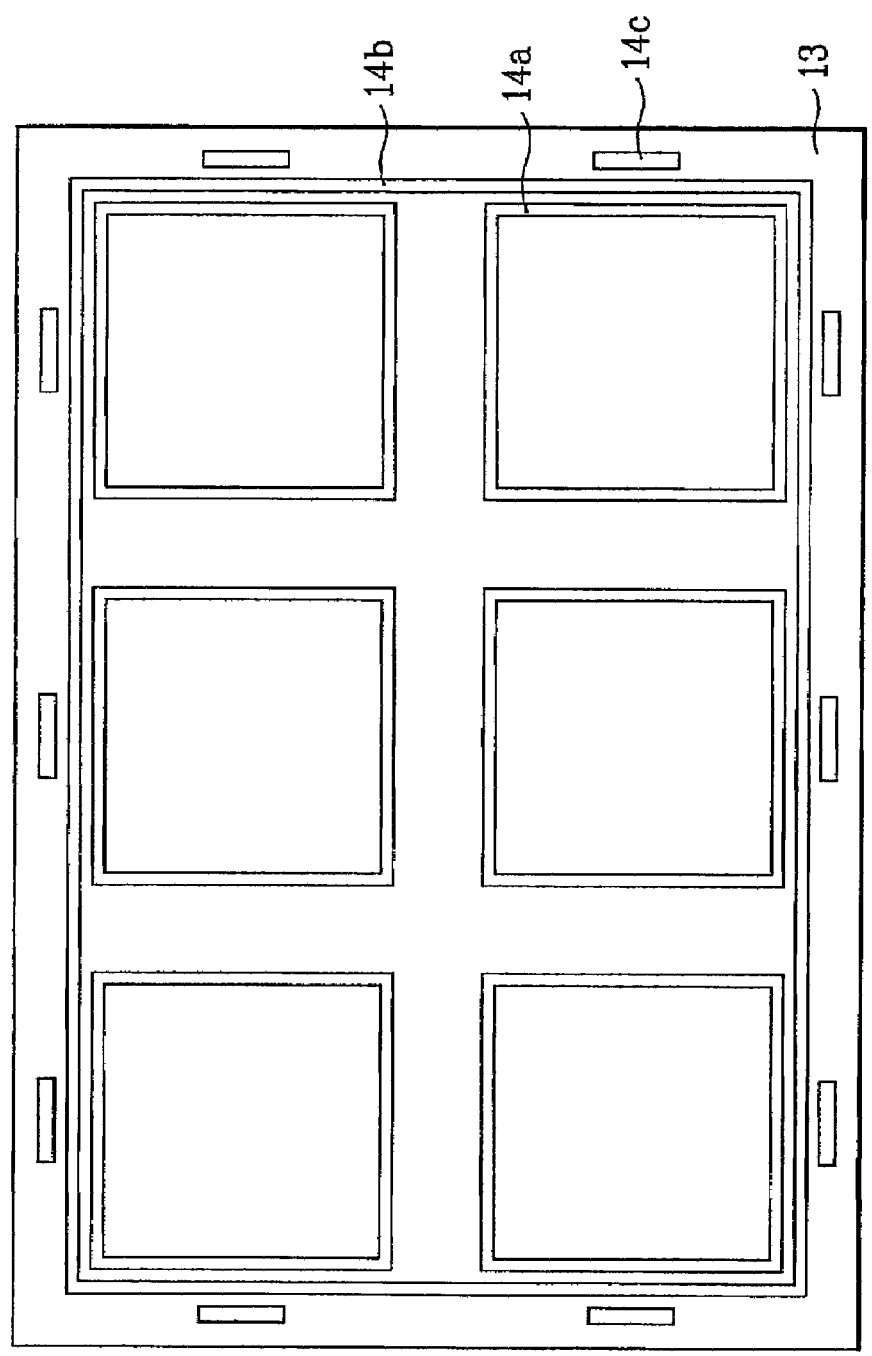
FIG. 4 illustrates a seal layout pattern in accordance with a first embodiment of the present invention.
Figure 10:
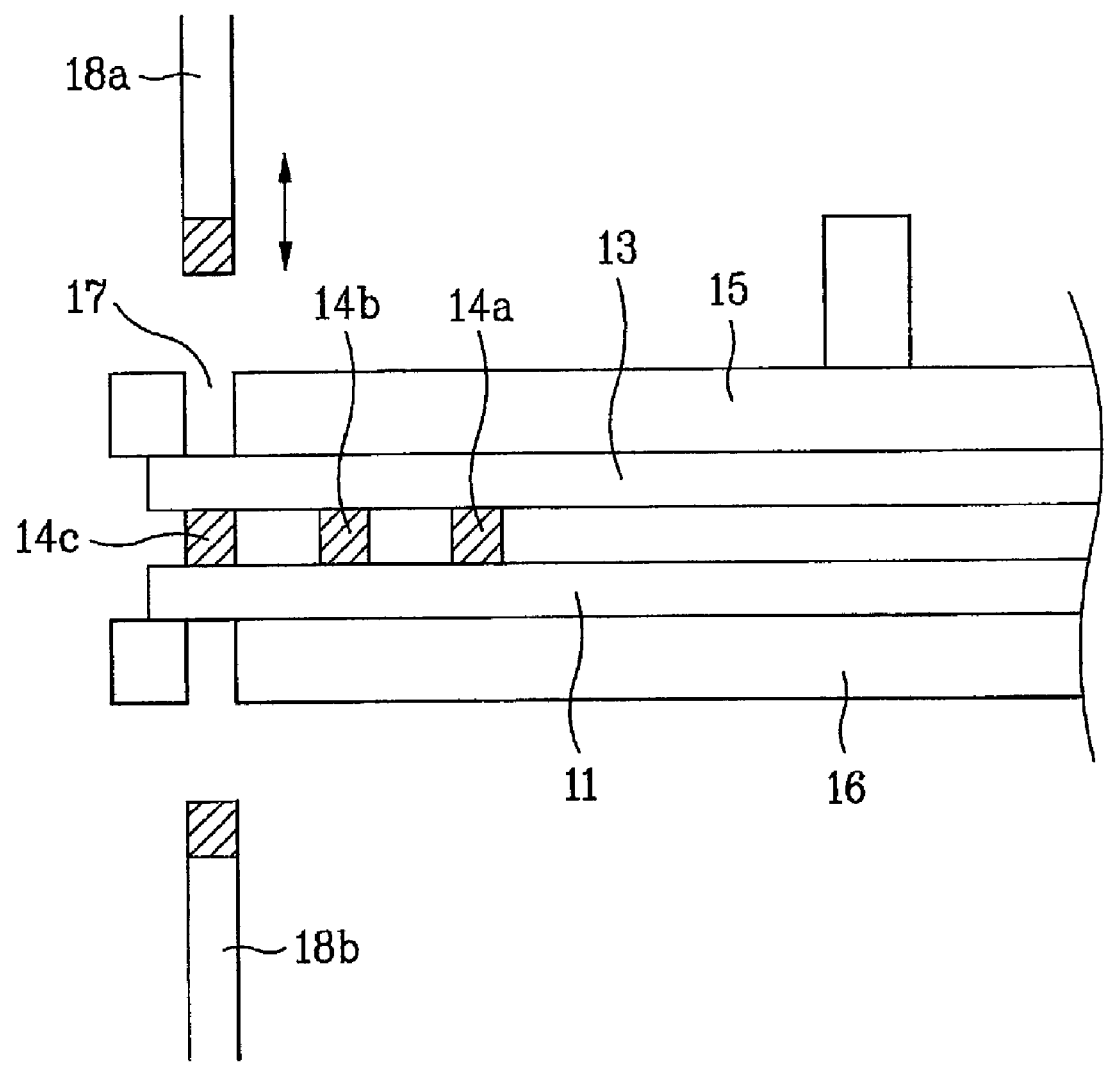
FIG. 10 illustrates a section across a line I–I' in FIG. 4 showing upper and lower stages and substrates.

FIG. 4 illustrates a seal layout pattern in accordance with a first embodiment of the present invention, and FIG. 10 illustrates a section across a line I–I' in FIG. 4 showing upper and lower stages and substrates.

Referring to FIG. 4, a method for fixing bonded substrates in accordance with a first embodiment of the present invention includes coating any of the aforementioned resins, forming a plurality of main seals 14a on a periphery of each panel for bonding and sealing the liquid crystal between the two substrates, forming a dummy seal 14b to surround a plurality of panels for protecting the main seals 14a on an inner side thereof during bonding and pressing, and forming a plurality of fixing seals 14c on an outer periphery of the dummy seal 14b (an outer periphery of the substrate) at fixed intervals for fixing the two substrates preliminarily, which are removed during cutting, on the second glass substrate 13 in the foregoing seal 14 coating.

The bonded two substrates may then be fixed by forming the fixing seals 14c, bonding the two substrates, directing a light (UV) to, and/or heating, the fixing seals 14c thereby setting the fixing seals 14c. When the fixing seals 14c are formed from a the light (UV) setting resin, light (UV) may be directed to the fixing seals 14c to fix the substrates. When the fixing seals 14c are formed of a thermosetting resin, heat may be applied to the fixing seals 14c for setting the fixing seals 14c.

Referring to FIG. 10, the upper stage 15 and/or the lower stage 16 includes a plurality of holes 17 for directing the light (UV) or applying heat. Before the aligned substrates are bonded, it may be assumed that the fixing seals 14c and the holes 17 are aligned. Accordingly, upon directing a light (UV) or applying heat to the fixing seals 14c from an upper stage side or a lower stage side through the holes 17, the fixing seals 14c are set, and the two substrates are fixed together. The light (UV) having a power of about 50–500 mW (e.g., 200 mW) is emitted from a light (UV) emitting pin (18a or 18b) for about 5–40 seconds (e.g., about 14 seconds) that moves down from an upper side of the bonding chamber or moves up from a lower side of the bonding chamber. When setting the fixing seals 14c using heat, a heating device 18a or 18b may be moved down from the upper side of the bonding chamber or moved up from the lower side of the bonding chamber to come into contact with a part of the first or second substrates 11 or 13 the fixing seals 14c formed thereon through the holes 17, and heats the fixing seals 14c. The fixing seals 14c may be heated at a temperature of about 50–200° C. for about 10 seconds to selectively setting the fixing seals 14c. Optionally, light (UV) direction and the heat application may be carried out simultaneously.

In one aspect of the invention, the main seals 14a, the dummy seal 14b, and the fixing seals 14c may all be formed on the second glass substrate. In another aspect of the present invention, the dummy seal 14b and/or the fixing seals 14c may be formed on the first glass substrate 11 and/or the fixing seals 14c may be formed of a material different from the main seals 14a. In another aspect of the present invention, either the main seals 14a may be formed on the first substrate 11 while the dummy seal 14b and/or the fixing seals 14c may be formed on the second glass substrate, or the main seals 14a may be formed on the second substrate 13 and the dummy seal 14b and/or the fixing seals 14c may be formed on the first glass substrate 11. In another aspect of the present invention, the main seals 14a, the dummy seal 14b, and the fixing seals 14c may all be formed on the first glass substrate 11.

Figure 5:
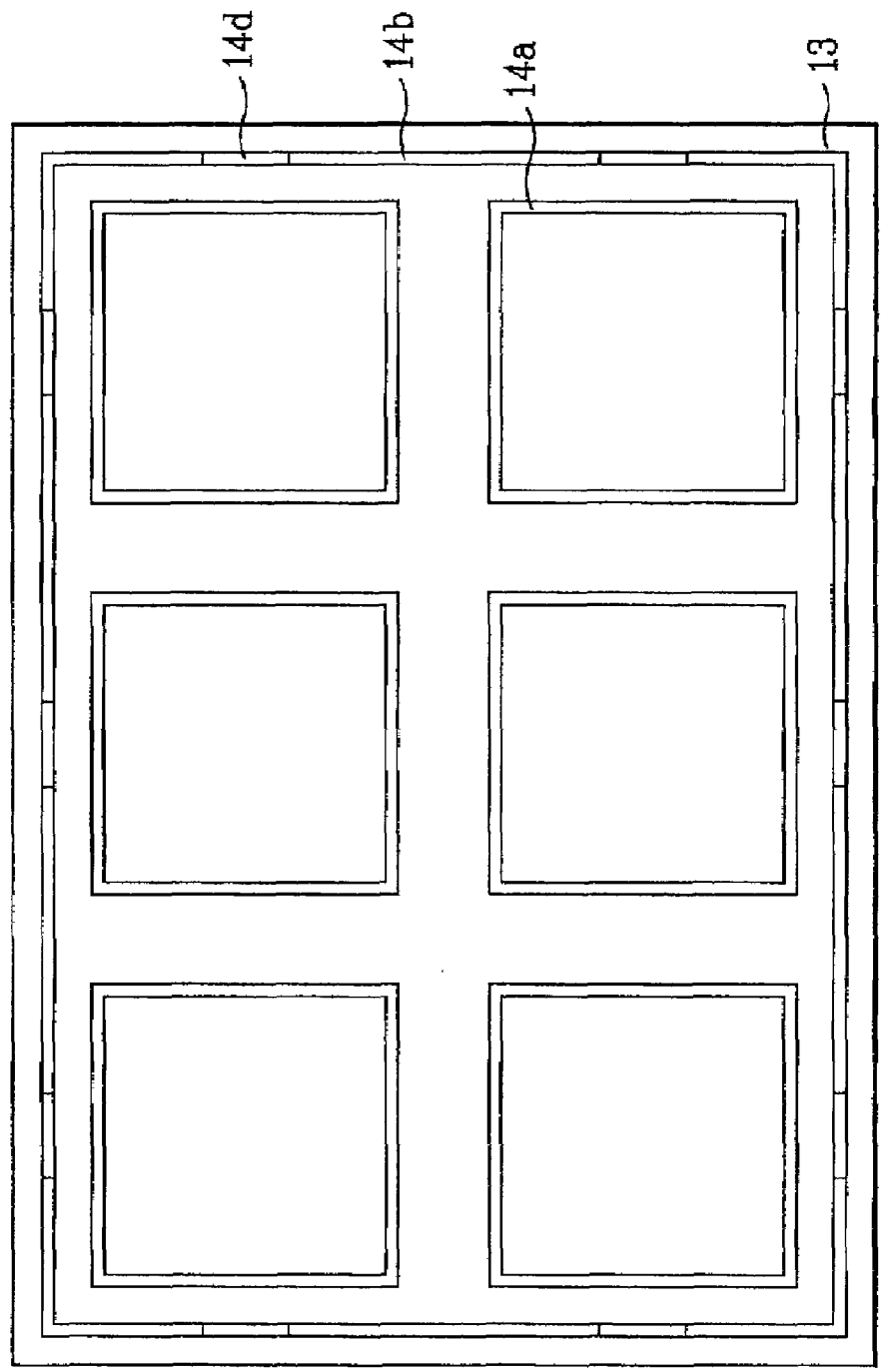
FIG. 5 illustrates a seal layout pattern in accordance with a second embodiment of the present invention.

FIG. 5 illustrates a seal layout pattern in accordance with a second embodiment of the present invention.

Referring to FIG. 5, a method for fixing bonded substrates in accordance with a second embodiment of the present invention includes coating a resin selected from aforementioned materials (e.g., photosetting resin, a thermosetting resin, a UV-thermosetting resin, and a pressure setting resin), forming a plurality of main seals 14a on a periphery of the second substrate for surrounding all the panels for bonding the two substrates and for sealing the liquid crystal between the two substrates, forming a dummy seal 14b to surround a plurality of panels for protecting the main seals 14a on an inner side thereof during bonding, and directing light (UV), and/or applying heat, to parts of the dummy seal 14b for fixing the two substrates.

In accordance with the present embodiment, the dummy seal 14b may be coated in the same region where the fixing seals are intended. Subsequently, light (UV) is directed, and/or heat is applied, to fix portions of the dummy seal 14b corresponding to fixing seal locations. The conditions of light (UV) direction and/or heat application are the same as in the first embodiment. Reference numeral 14d denotes the regions in the dummy seal 14b where the light (UV) is directed and/or the heat is applied. Accordingly, the dummy seal 14b may be used to form fixing seals equivalent to those found in the first embodiment.

Figure 6:
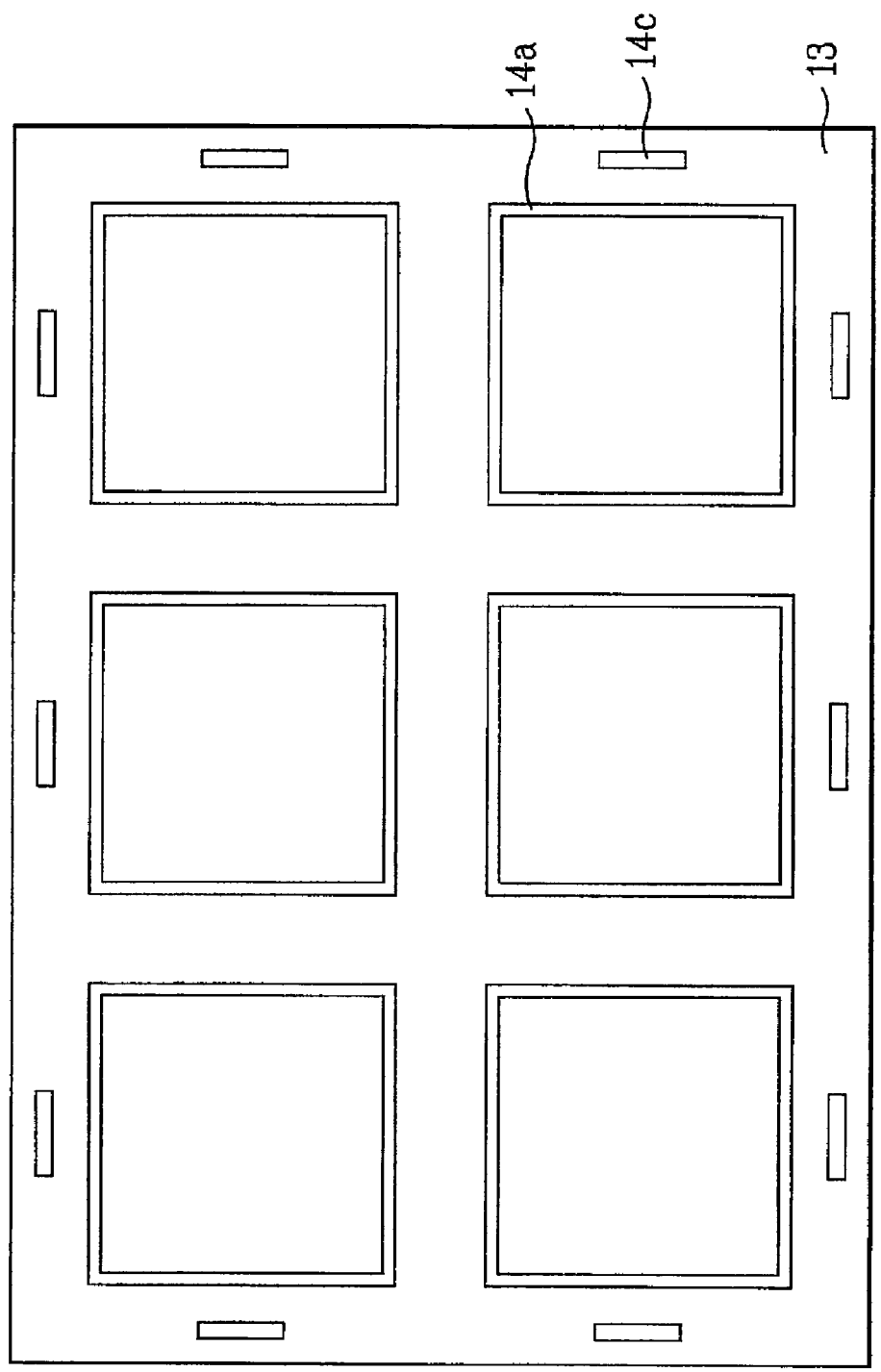
FIG. 6 illustrates a seal layout pattern in accordance with a third embodiment of the present invention.

FIG. 6 illustrates a seal layout pattern in accordance with a third embodiment of the present invention.

Referring to FIG. 6, a method for fixing bonded substrates in accordance with a third preferred embodiment of the present invention includes omitting formation of the dummy seal. Accordingly, the two substrates may be fixed together by forming only the main seals 14a and the fixing seals 14c in a periphery of the substrate and directing a light (UV), applying heat, and/or pressure, to the fixing seals 14c as similarly described in the first embodiment of the present invention. Further, the fixing seals 14c may have a closed form, as with the dummy seal in the previous embodiments.

Figure 7:
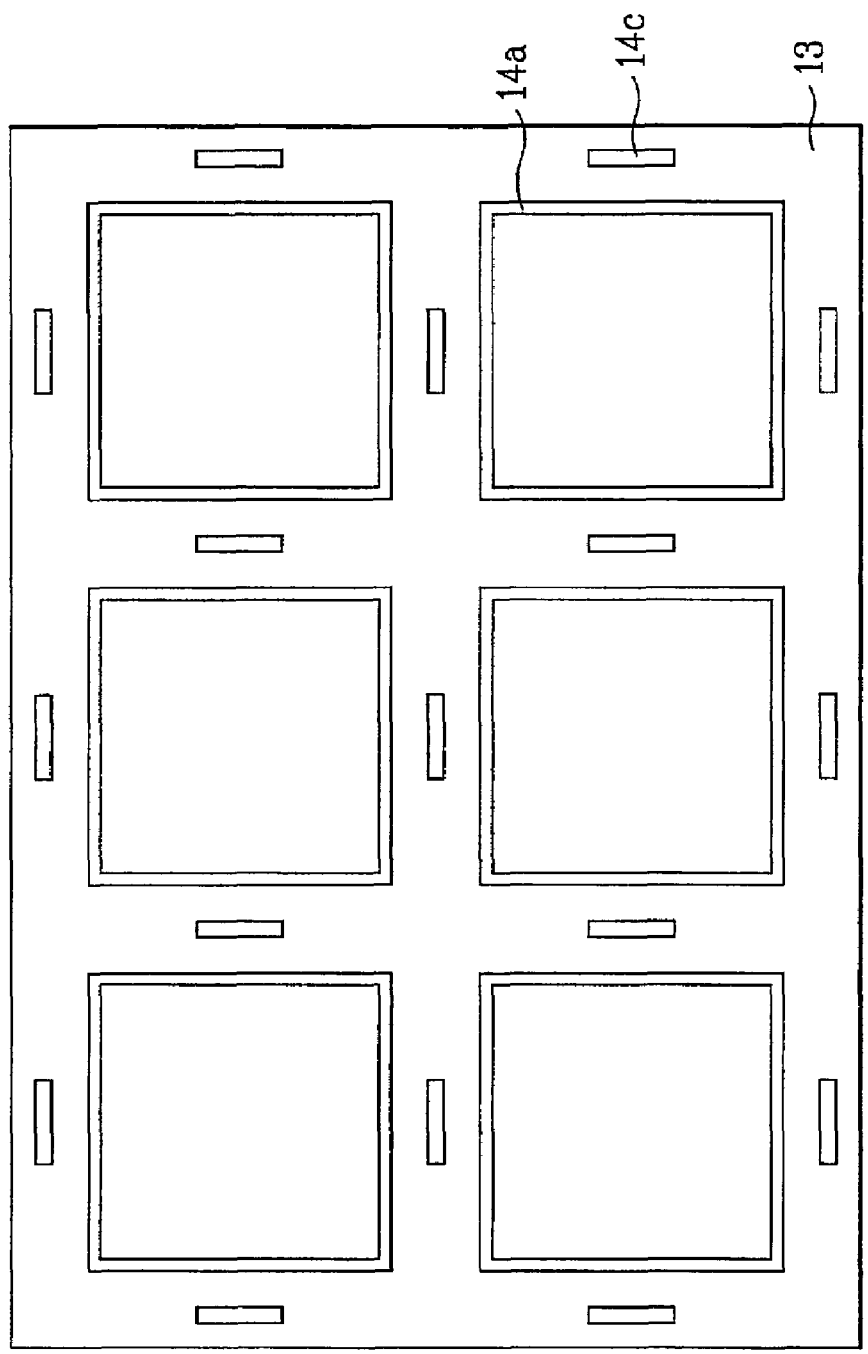
FIG. 7 illustrates a seal layout pattern in accordance with a fourth embodiment of the present invention.

FIG. 7 illustrates a seal layout pattern in accordance with a fourth embodiment of the present invention.

Referring to FIG. 7, a method for fixing bonded substrates in accordance with a fourth embodiment of the present invention fixes the two bonded substrates by forming the fixing seals 14c in a periphery region of the substrate and also at fixed intervals in cutting regions between panels. Light (UV) may be directed and/or heat or pressure may be applied to the fixing seals 14c as with the third embodiment of the present invention. Other conditions are the same with the first embodiment.

Figure 8:
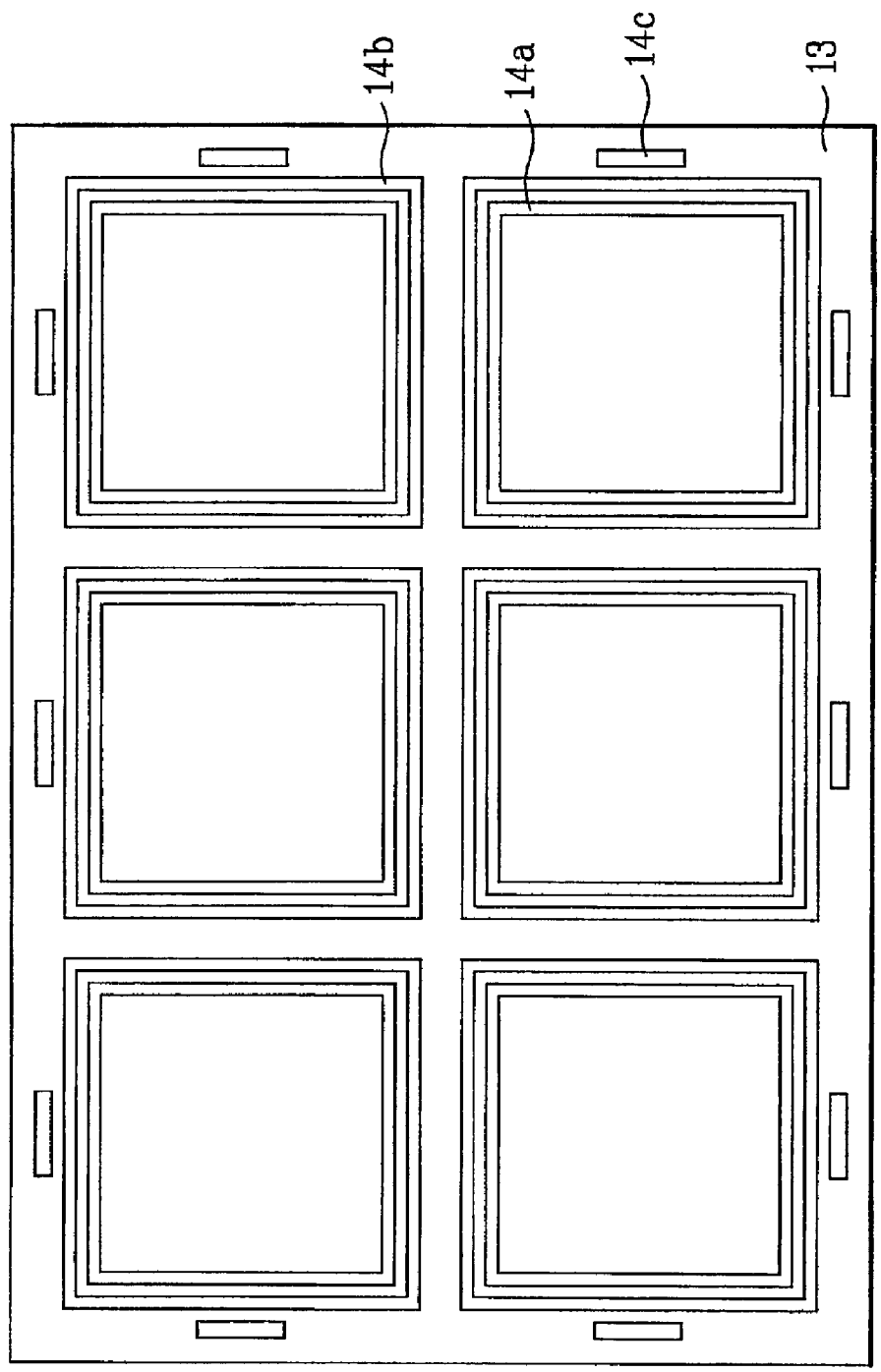
FIG. 8 illustrates a seal layout pattern in accordance with a fifth embodiment of the present invention.

FIG. 8 illustrates a seal layout pattern in accordance with a fifth embodiment of the present invention.

Referring to FIG. 8, a method for fixing bonded substrates in accordance with a fifth embodiment of the present invention fixes the two bonded substrates by forming a plurality of dummy seals that surround each of panels (main seals), forming the fixing seals 14c in a periphery of the substrate, and directing a light (UV) and/or applying heat or pressure to the fixing seals 14c as previously described with reference to the first embodiment of the present invention. Other conditions are the same with the first embodiment.

Figure 9:
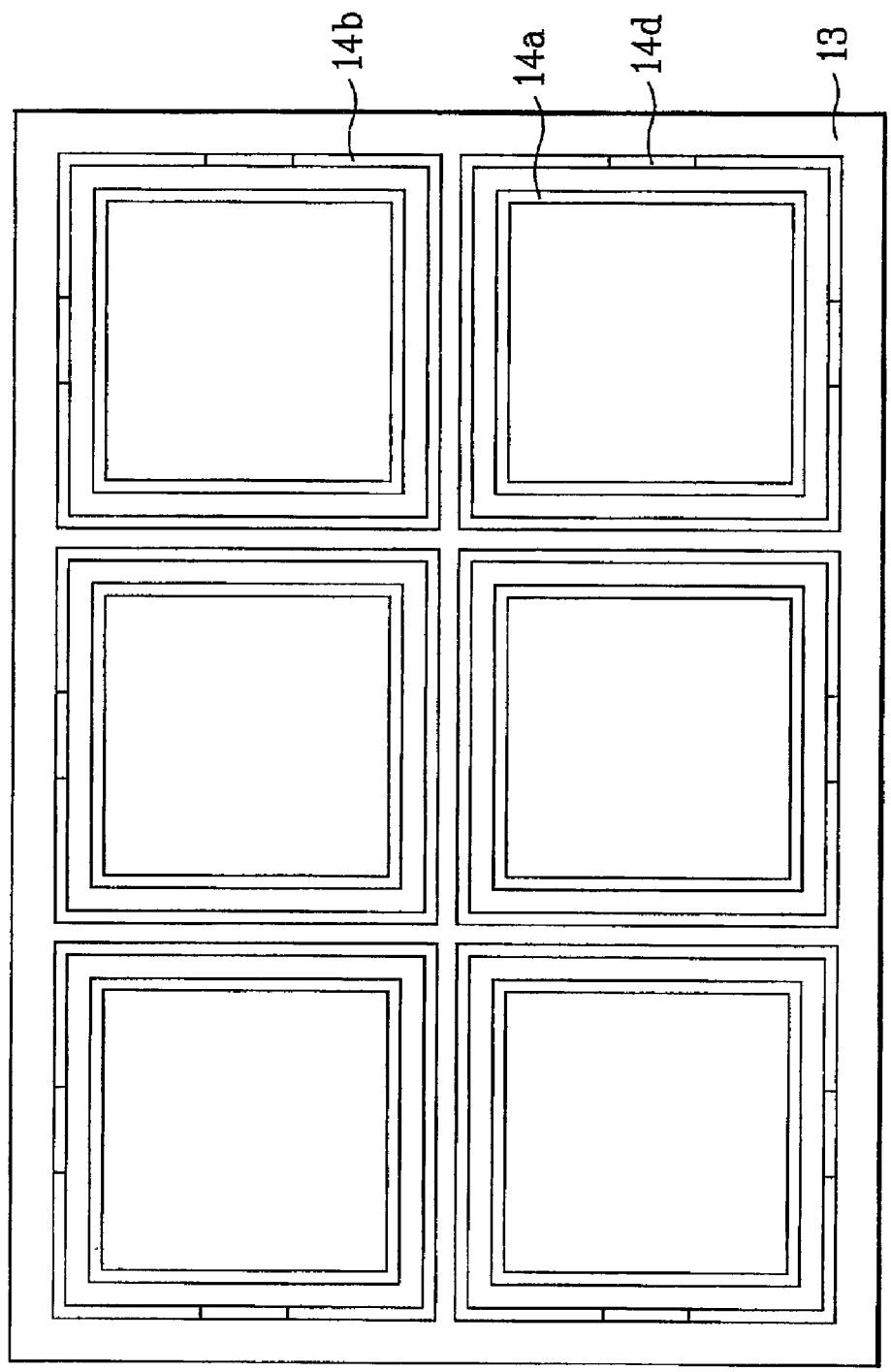
FIG. 9 illustrates a seal layout pattern in accordance with a sixth embodiment of the present invention.

FIG. 9 illustrates a seal layout pattern in accordance with a sixth embodiment of the present invention.

Referring to FIG. 9, a method for fixing bonded substrates in accordance with a sixth embodiment of the present invention fixes the two bonded substrates by selectively directing light (UV) and/or applying heat to portions of a plurality of dummy seals 14b formed on each panel. Light and/or heat may be selectively directed/applied to the dummy seals 14b in accordance with the fifth embodiment of the present invention. Other conditions are the same with the first embodiment.

In each of the foregoing embodiments, the main seals 14a, the dummy seals 14b, and the fixing seals 14c may or may not be formed on the same substrate, and the main seals or the dummy seals may be formed on the substrate having the liquid crystal applied thereto.

Though not shown in the FIGS, a method for fixing bonded substrates in accordance with a seventh embodiment of the present invention fixes the two bonded substrates, not by forming separate dummy seals or fixing seals, but by selectively directing light (UV) and/or applying heat to portions of the main seals, wherein the main seals may be formed of a light (UV) setting resin, a thermosetting resin, or a light (UV) and thermosetting resin.

Also, though not shown in the FIGS, a method for fixing bonded substrates in accordance with an eighth embodiment of the present invention fixes the two bonded substrates by applying an adhesive, having a setting property better than that of the seals, to parts the fixing seals 14c in the first, third, fourth, or fifth embodiment, and bonding the first and second glass substrates using the adhesive.

Once fixing of the two bonded substrates are finished, misalignment of the bonded first and second glass substrates may be prevented during transfer of the substrates for subsequent fabrication processes.

Figure 2F:
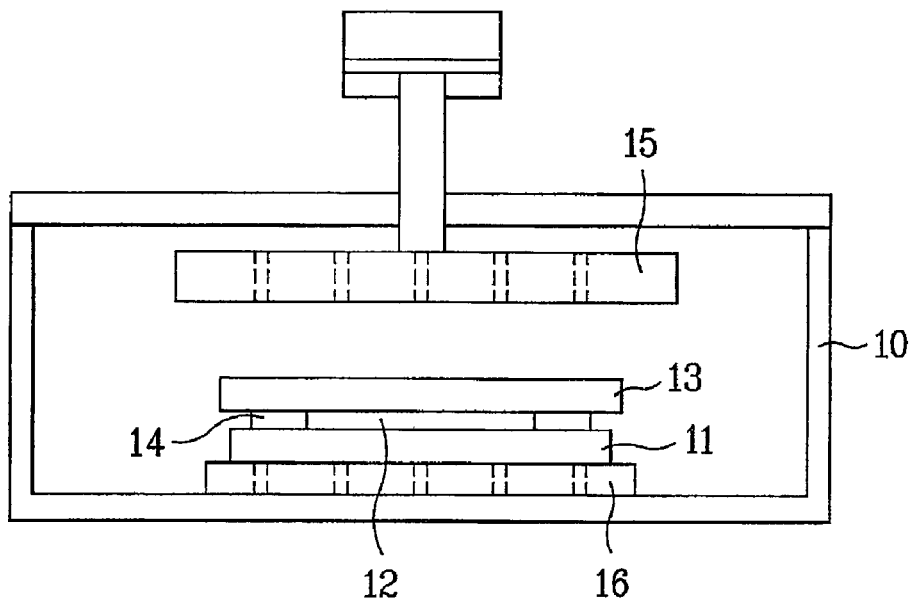

Referring to FIG. 2F, when fixing of the two bonded substrates is finished, the ESC is turned off and the upper stage 15 is moved up. Accordingly, the upper stage 15 is separated from the fixed two glass substrates 11 and 13. Next, the substrates are unloaded in an unloading step (38S) using the loader. Alternatively, the ESC may be left on only in the upper stage and the fixed first and second glass substrates 11 and 13 are lifted by the upper stage. Next, the loader unloads the first and second glass substrates 11 and 13 from the upper stage 16.

In order to shorten the fabrication time for the LCD, one of the first and second glass substrates to be bonded in a next bonding process may be loaded onto an empty stage while the fixed first and second glass substrates are unloaded. For example, after the second glass substrate 13 to be bonded in a next bonding process is brought to the upper stage 15 via the loader and held to the upper stage, the fixed first and second glass substrates on the lower stage 16 may be unloaded. Alternatively, after the upper stage 15 lifts the fixed first and second glass substrates 11 and 13, the loader may load a first glass substrate 11 to be bonded in a next bonding process onto the lower stage, and the fixed first and second glass substrates may be unloaded.

A liquid crystal spreading process may optionally be added before the process of unloading the bonded substrates where the liquid crystal between the fixed substrates may be spread, for example, toward the seal. Alternatively, a liquid crystal spreading process may be carried out to evenly spread the liquid crystal toward the seal when the liquid crystal does not adequately spread after the unloading. The liquid crystal spreading process may be carried out for more than 10 min. under atmospheric pressure or in a vacuum.

As has been explained, the method for fabricating an LCD according to the present invention has the following advantages.

First, applying the liquid crystal on the first substrate and coating the seal on the second substrate shorten a fabrication time prior to bonding the two substrates together.

Second, applying the liquid crystal on the first substrate and coating the seal on the second substrate permits a balanced progression of the fabrication processes to the first and second substrates, thereby making efficient use of a production line.

Third, applying the liquid crystal on the first substrate and coating the seal and Ag dots on the second substrate minimizes contamination of the seal from particles because the substrate having the seal coated thereon may be cleaned just prior to bonding.

Fourth, positioning the substrate receiver under the substrate and evacuation of the vacuum bonding chamber permits the substrate affixed to the upper stage from falling down and breaking.

Fifth, sensing the time during which the two substrates come into contact and the varying the pressure in bonding the two substrates minimizes damage made by the liquid crystal to the orientation film.

Sixth, since the upper stage presses the substrate down by means of a plurality of shafts, each of which capable of applying pressure independently, uniform bonding of the seal can be achieved by independently applying a lower or higher pressures by predetermined shafts when the lower stage and the upper stage are not level or fail to bond to the seal uniformly.

Seventh, the two staged evacuation of the vacuum bonding chamber prevents deformation of the substrate and air flow in the chamber caused by a sudden vacuum.

Eighth, misalignment of the fixed substrates is minimized during progression to the next bonding processes or transfer of fixed substrates.

Ninth, simultaneous loading and unloading of glass substrates shortens fabrication times.

Tenth, inclusion of a liquid crystal spreading process shortens the LCD fabrication time.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD), comprising:
   preparing a first substrate and a second substrate;
   providing a liquid crystal on at least one of the first and second substrates;
   providing main seals for sealing the liquid crystal applied on a plurality of LCD panels and fixing seals outside the main seals on at least one of the first and second substrates;
   loading the first substrate and the second substrate into a bonding chamber;
   bonding the first and second substrates;
   curing the fixing seal in the bonding chamber, thereby fixing the first substrate to the second substrate; and
   unloading the fixed first and second substrates.

2. A method as claimed in claim 1, wherein the curing includes at least one of directing a light, applying heat, and applying pressure to the portion of the main seals.

3. A method as claimed in claim 1, further comprising curing after the bonding is complete.

4. A method as claimed in claim 1, wherein the curing includes the step of at least one of directing a light, applying heat, and applying pressure to the fixing seals.

5. A method as claimed in claim 4, wherein the fixing seals are formed in a periphery region.

6. A method as claimed in claim 4, wherein the fixing seals are formed in a periphery region of the first substrate.

7. A method as claimed in claim 4, wherein the fixing seals are formed in parts to be cut between panels and in a periphery region.

8. A method as claimed in claim 1, further including a dummy seal for protecting the main seals; and
   the curing includes the step of at least one of directing a light, applying heat, and applying pressure to the fixing seals, thereby fixing the first and second substrates.

9. A method as claimed in claim 8, wherein the dummy seal surrounds the main seals.

10. A method as claimed in claim 8, wherein the dummy seal surrounds each of the main seals.

11. A method as claimed in claim 8, wherein the fixing seals are formed in a periphery region of the substrate or in regions between panels.

12. A method as claimed in claim 1, wherein the fixing seals are formed on the first substrate or the second substrate.

13. A method as claimed in claim 1, further including a dummy seal for protecting the plurality of main seals, and the curing includes the step of at least one of directing a light, applying heat, and applying pressure to the dummy seal, thereby fixing the first and second substrates.

14. A method as claimed in claim 13, wherein the main seals are formed on the second substrate and the dummy seal is formed on the first substrate.

15. A method as claimed in claim 13, wherein the dummy seal surrounds the plurality of main seals.

16. A method as claimed in claim 13, wherein the dummy seal surrounds each of the main seals.

17. A method as claimed in claim 13, wherein the curing includes curing a portion of the dummy seal.

18. A method as claimed in any one of claims 2, 4, 8, and 13, wherein the light has a power of about 50–500 mW and is directed for more than about 5 seconds.

19. A method as claimed in any one of claims 2, 4, 8, and 13, wherein the heat is applied at a temperature of about 50–200° C. for more than about 10 seconds.

20. A method as claimed in any one of claims 2, 4, 8, and 13, wherein the step of at least directing a light, or applying heat includes the steps of:
   moving a light directing pin or a heating device from an upper side of the bonding chamber to a lower side of the bonding chamber, or
   moving a light directing pin or a heating device from a lower side of the bonding chamber to an upper side of the bonding chamber.

21. A method as claimed in claim 1, further comprising curing before the bonding is complete.

22. A method for fabricating an LCD, comprising:
loading a first substrate having liquid crystal applied thereto and main seals formed thereon, and a second substrate having fixing seals formed thereon, into a bonding chamber, wherein the fixing seals are formed at a periphery of the second substrate;
bonding the first and second substrates;
curing the fixing seals to fix the first and second substrates together in the bonding chamber; and
unloading the fixed first and second substrates.

23. A method as claimed in claim 22, further comprising:
forming each main seal at a periphery of a corresponding panel region of the first substrate; and
forming each fixing seal at a region of the second substrate that is aligned with portions of the first substrate not occupied a panel region.

24. A method for fabricating an LCD, comprising:
loading a first substrate having liquid crystal dropped thereon and main seals and fixing seals formed thereon, and a second substrate, into a bonding chamber;
bonding the first and second substrates;
selectively curing the fixing seals with respect to the main seals to fix the first and second substrates together in the bonding chamber; and
unloading the fixed first and second substrates.

25. A method as claimed in claim 24, further comprising:
forming each main seal at a periphery of a corresponding panel region of the first substrate; and
forming each fixing seal on portions of the first substrate not occupied a panel region.

26. A method for fabricating an LCD, comprising:
loading a first substrate having liquid crystal dropped thereon and fixing seals formed thereon, and a second substrate having main seals formed thereon, into a bonding chamber, wherein the fixing seals are formed at a periphery of the first substrate;
bonding the first and second substrates;
curing the fixing seals to fix the first and second substrates together in the bonding chamber; and
unloading the fixed first and second substrates.

27. A method as claimed in claim 26, further comprising:
forming each main seal at a periphery of a corresponding panel region of the second substrate; and
forming each fixing seal at a region of the first substrate that is aligned with portions of the second substrate not occupied a panel region.

28. A method for fabricating a liquid crystal display (LCD), comprising:
loading a first substrate and a second substrate into a bonding chamber, wherein at least one of the first and second substrates has seals formed thereon;
coating an adhesive with a setting property better than that of the seals to portions of the second substrate to be cut or to a periphery of the second substrate;
curing the adhesive in the bonding chamber;
bonding the first and second substrates; and
fixing the bonded substrates using the adhesive.

29. A method for fabricating a liquid crystal display (LCD), comprising:
providing a liquid crystal on a first substrate;
providing a first seal on a second substrate, the first seal that seals the liquid crystal in a liquid crystal panel to be formed;
providing a second seal on one of the first and second substrates;
loading the first substrate and the second substrate into a bonding chamber;
aligning and bonding the first and second substrates;
curing the second seal in the bonding chamber to maintain an alignment of the bonded first and second substrate;
unloading the fixed first and second substrates.

30. A method as claimed in claim 29, wherein the curing includes one of directing a light and applying heat.

31. A method as claimed in claim 30, wherein the second seal is formed at a periphery of said one of the first and second substrates.

32. A method as claimed in claim 31, further including a third seal between the first and second seals.

33. A method as claimed in claim 31, further comprising cleaning the second substrate after providing the first seal on the second substrate.

34. A method as claimed in claim 30, wherein the light has a power of about 50-500 mW and is directed for more than about 5 seconds.

35. A method as claimed in claim 30, wherein the heat is applied at a temperature of about 50-200° C. for more than about 10 seconds.

* * * * *